Aug. 14, 1956    P. E. CLINGMAN    2,758,727
SHIPPING SPACER

Filed Oct. 2, 1952    3 Sheets-Sheet 1

INVENTOR.
PAUL E. CLINGMAN
BY
*Willets Hardman & Tebe*
*his* ATTORNEYS

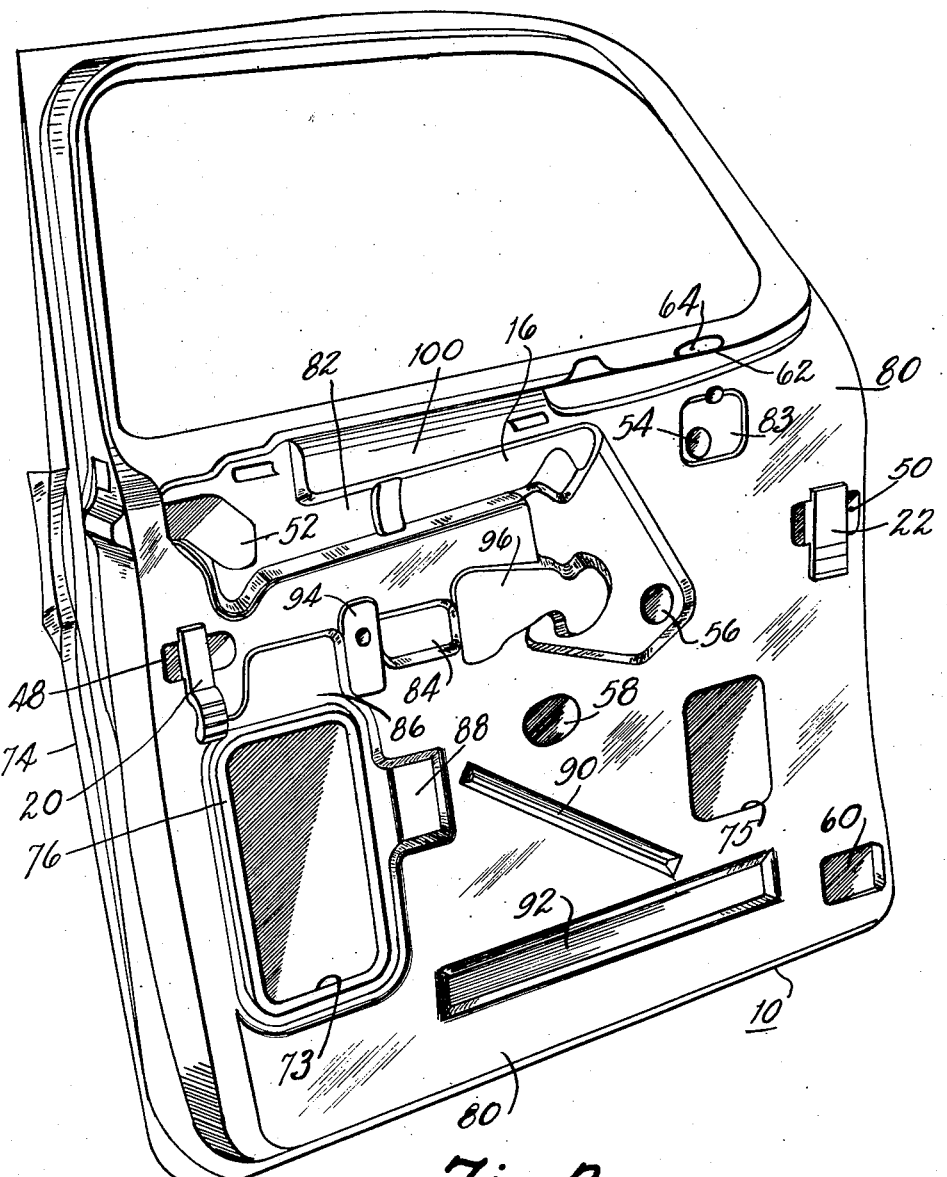

Aug. 14, 1956    P. E. CLINGMAN    2,758,727
SHIPPING SPACER
Filed Oct. 2, 1952    3 Sheets-Sheet 3

INVENTOR.
PAUL E. CLINGMAN
BY
His ATTORNEYS

United States Patent Office 2,758,727
Patented Aug. 14, 1956

2,758,727

SHIPPING SPACER

Paul E. Clingman, Dayton, Ohio, assignor to General Motors Corporation, Detroit, Mich., a corporation of Delaware Application October 2, 1952, Serial No. 312,722

2 Claims. (Cl. 214—10.5)

This invention deals with a shipping spacer to be used in the transportation of composite structures of relatively flat panel-like units in the form of sub-assemblies, such as automobile doors, trunk decks, wall members, roof and hood elements, and like structures. The spacers are attached to one of the items to be shipped, and serve to space the items when they are stacked or ranked between the walls of a freight car, truck body or shipping crate, the articles to be shipped being held in spaced relation against rubbing or chafing.

In the art of automobile manufacture and repair there is considerable activity in the transportation of body parts that have at least one highly polished or finished surface, that are backed up by a wall member or unfinished or rough structural surface. In transporting such body parts, whether it be by train or truck or even marine transportation, there is difficulty in transporting the parts without marring, scratching or abrading the highly finished surface due to the movement of one of the body parts with respect to an adjacent part. Applicant solves the problem by providing a spacer of compressible or pliable material which is quickly attached to one of the wall members and that has a pad-like portion disposed between the adjacent members as they are stacked, ranked or packed between the containing walls of the freight car, truck or the like. Upon reaching their destination, the spacers are removed from the article and returned to the source of shipment for re-use.

While this invention is described in connection with the shipment or transportation of vehicle body parts, the invention is applicable to the transportation of other relatively flat panel-like structures, such as finished wall panel or sections of prefabricated houses or apartments, garages, cabins, telephone booths and many other structures where it is desired to protect at least one surface against abrasion or other marring, or other damage resulting from transportation.

Further objects and advantages of the present invention will be apparent from the following description, reference being had to the accompanying drawings wherein a preferred embodiment of the present invention is clearly shown.

In the drawings:

Figure 2 is a perspective view of an automobile door fitted with a shipping spacer preparatory to ranking with a like article as shown in Figure 1;

Figure 1:
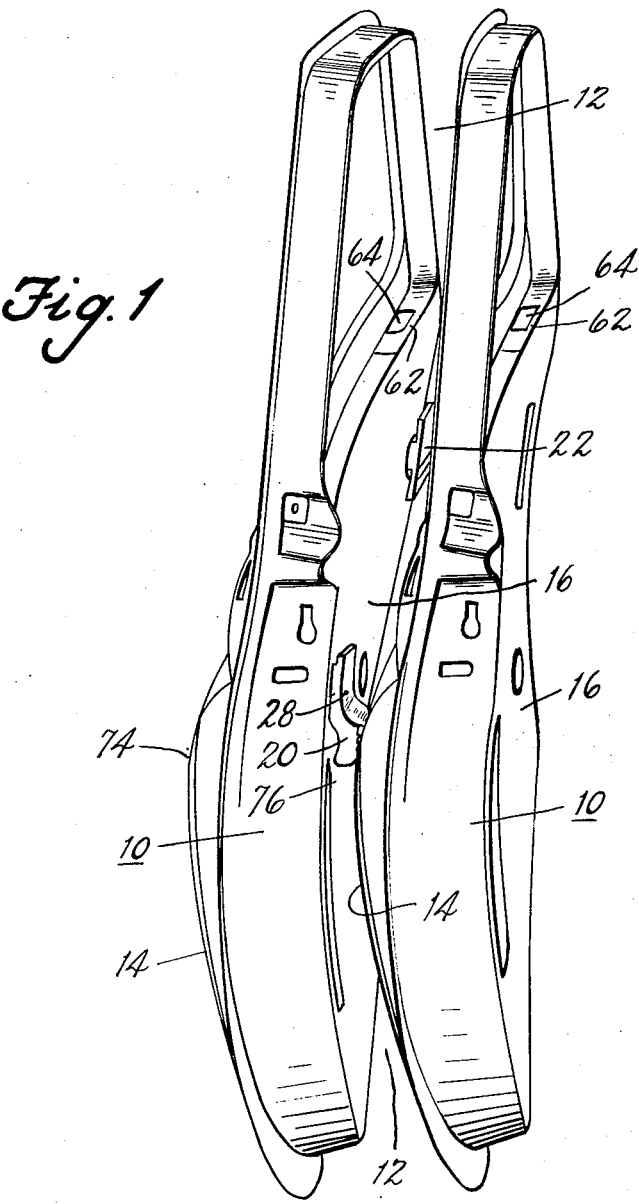
Figure 1 is a view, more or less perspective, showing a spacer of this invention as used in transportation of a plurality of automobile doors.

Referring to the drawings and first with respect to Fig. 1, the numeral 10 refers to a pair of panel-like units ranked in tiers or rows as they would be disposed across the width of a freight car, a truck body or crate, the units being spaced as indicated as 12. Each of the units 10, illustrated as automobile doors, provides a finished surface wall member 14, and a spaced unfinished wall member indicated at 16. The finished wall 14 is that of the outside of an automobile door, which may carry a high lustre finish, and the wall member 16 is an unfinished surface that usually is later covered up by upholstery and interior finish of the automobile. It is very desirable to protect the wall surface 14 from any chafing or abrasion during transportation or shipment so that a refinish job will not be necessary. Heretofore, it has been the practice to insert in space 12 between the stacked units 10, a sheet of corrugated cardboard which required an extra workman who puts the cardboard in place against one unit while an adjacent unit is set up against it by another workman. The results are unsatisfactory because the cardboard is easily compressed or compacted due to any relative movement between the doors, and can readily be ground through or pierced when the wall of one unit is engaged by the near wall of an adjacent unit. Further, a new sheet of cardboard had to be used between adjacent stacked or ranked units.

Failure of the crushed cardboard to recover left the stacked or ranked units loosely packed in the vehicle or crate, and contributed to further damage. When the cardboard is replaced by a shipping spacer 20, all of the difficulties and objections are overcome, since the units 10 may then be shipped long distances and over rough ways without material damage to the finished surfaces 14. The shipping spacers 20 are composed of yieldable rubber-like material temporarily but securely attached to one of the wall members of each unit 10, so that in stacking or racking the units the spacers 20 will be disposed between the portions of the assembly that have a minimum spacing 12. The spacers may be attached to the units 10 at some convenient point along the line of assembly or finish of the units, so that they will be in place when it is desired to stack or rank the units 10 one against another.

Figure 4:
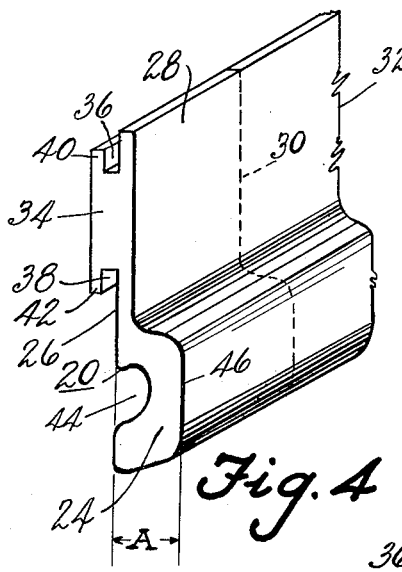
Figure 4 is a perspective view of an extruded rubber strip from which the shipping spacers may be formed.

In Fig. 2 there are shown shipping spacers 20 and 22 mounted on the unfinished wall 16 of the unit, which cooperate to effect proper spacing between successive units 10 stacked or ranked as shown in Fig. 1. These spacers have what is called a pad portion 24 as shown in Fig. 4 that joins by shank 26 an attaching portion 28, being a unitary part sheared along the line 30 from an extruded rubber strip 32. In forming this strip there is provided a main rib portion 34, the opposite sides of which are grooved at 36 and 38 to leave the lips or flanges 40 and 42 extending in opposite directions. The pad-like portion 24 is fashioned to be compressible or yieldable, and to have an accumulated thickness A that is in excess of the minimum spacing between the units 10 when ranked as shown in Fig. 1.

Figure 5:
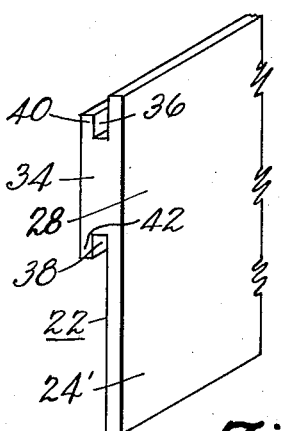
Figure 5 is an end view of a modified form of the shipping spacer.
Figure 6:
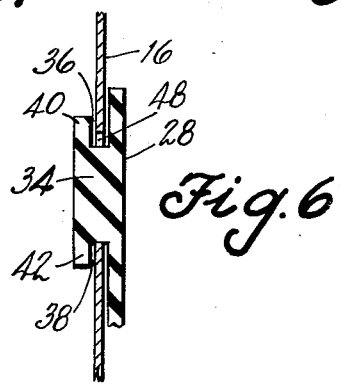
Figure 6 is a sectional view through the attachment portion of one of the spacers.
Figure 3:
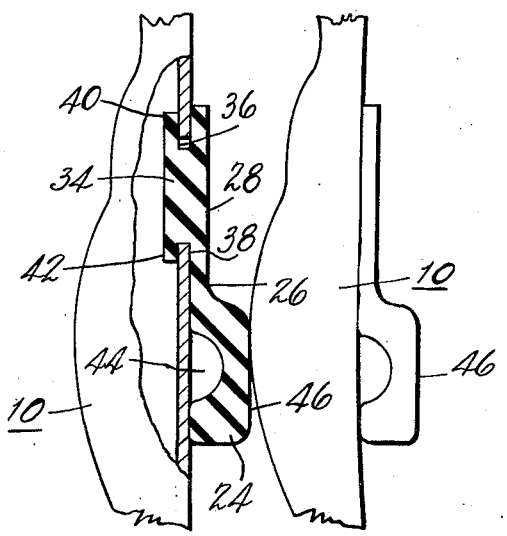
Figure 3 is an enlarged detail view showing a shipping spacer and part of an automobile door to which it is attached.

As shown in Fig. 4, the pad portion has an arcuate channel 44 disposed on one side and a relatively flat surface 46 directly opposite, the surface 46 providing a relatively large contact area engageable with the finished surface 14. In Fig. 5, the attachment portion 28 is substantially the same as that shown in Fig. 4, with the portion 26 connecting it to a pad portion 24' of less thickness. As shown in Fig. 6, the main rib portion 34 is of less area in cross-section than the aperture 48 through which it extends when in the assembled position. Grooves 36 and 38 may also be of greater width than the thickness of wall 16. The attaching portion 28 is dimensioned as to the main rib 34, flanges 40 and 42 to permit easy assembly with the wall member 16, by snapping into a wall opening 48 thereof. This is accomplished by inserting flange 40 within the aperture 48, and moving upwardly until the bottom of the groove 36 engages the edge of the opening 48, then by pressing inwardly on the rib portion 34 until the lower flange 42 snaps inwardly over the lower edge of the opening 48 to assume position inside the wall 16.

Figure 7:
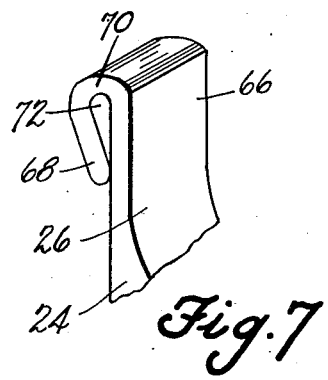
Figure 7 illustrates a modified form of the attachment portion.

There are several holes through the wall member 16 of unit 10, they being indicated at 50, for reception of the spacer 22, as well as openings 52, 54, 56, 58 and 60, any one of which might be used for attaching one of the spacers according to the method shown in Fig. 6. In some instances it may be desirable to mount the spacer over an edge portion of unit 10, as is indicated at 62, which is afforded as shown in Fig. 1 by an opening 64 located close to an edge of the wall member. In that instance, the shipping spacer might have attaching portions 66 of the form shown in Fig. 7, where a flange 68 is integrally joined by a hinge at 70 to provide a channel 72 for reception of the edge of a wall member of unit 10. In attaching this spacer, it is merely hooked over the edge of the wall member, with the flange 68 disposed between members 14 and 16, and the pad member 24 extending on the outside. Also, the shipping spacer of Fig. 7 might be hooked over the lower edge of large openings 73 or 75. This mode of attachment permits limited movements of the spacer relative to wall 16 as the articles shift in transit.

The pad portion 24 may have any sectional dimension that is necessary, desired or required to properly space the units 10, and may be strategically located on the unit 10 to provide the results desired. As shown in Fig. 2, the spacers 20 and 22 are situated substantially equal distances from the bottom edge of the door, and it is deemed sufficient to use only the two spacers since the bottom edge of the door resting on the floor of the car body or crate will be sufficient to prevent tilting of the units by which they might become dislodged and chafed. If the shipping spacers were to be located in holes 48, 54 and 60 there would be obtained a three-point contact between successive units. One important point with regard to the pad portion 24 is that it shall have a composite thickness of somewhat greater magnitude than the minimum spacing between aligned parts of the units 10 when they are in their stacked relation. As shown in Fig. 1, the finished wall 14 has a high point 74 and in Fig. 2 there is a high point 76 on the wall 16 almost opposite and located in such manner that the portions 74 and 76 determine the maximum thickness of the unit 10. In this particular instance the wall member 16 is a stamped member of sheet metal that provides the openings 48 to 60 in any one of which might be secured the spacers. The main level 80 of the wall member 16 is embossed to provide depressions 82, 84, 86, 88, 90 and 92 along with the aforementioned raised portion 76, as well as 94, 96, 98, 100 and others.

Openings 48, 50, 58 and 60 occur in the main level 80 of the wall member 16, and openings 52, 54 and 56 occur in depressions 82 and 83. Obviously, such openings might occur in any one or more of the raised portions above the main level 80. The attachment portion of the spacers may be inserted in any one of the openings whether they be in the main level, low level or the high level of the stamping. Regardless of the level of the stamped member through which the openings occur, the pad portion of the spacer must exceed in accumulated thickness the maximum height of any of the raised portions 76 to 100. Then, if high portions on each of the walls 14 and 16 are in substantial alignment when the units 10 are stacked for shipment, the wall members for adjacent units will be separated by the pad portion to prevent direct mechanical engagement between the wall portions. The shank portion 26, being of flexible rubber, will flex sufficiently to allow the pad portion to bottom against the wall surface adjacent the opening irrespective of whether the opening selected for attachment is through the main level 80, a depressed level or a higher level than the main level 80.

When a unit to be shipped or transported is fitted with the shipping spacers, they can be stacked or ranked readily and quickly without regard to the cardboard insertion. They do not require the presence of an extra workman to place the spacing members when the units are being stacked. During transportation or relative movement of the units, the pad portion being soft and pliable will keep the units properly spaced and the surface of the pad member engaging the finished surfaces of the units will not mar or deface the units. Movement of the spacer relative to the unit to which it is attached and commensurate with the adjacent article with which it is in contact is permitted by the dimensions of the main rib portion 34 and grooves 36 and 38 relative to the aperture through which it is attached. The spacer pad will then move with wall surface 14 and not chafe or mar it. Similar movement is permitted by the attaching portion 66 of the modification shown in Fig. 7. At the end of the trip, the shipping spacers are easily removed and returned to the shipper for repeated use.

While the embodiment of the present invention as herein disclosed constitutes a preferred form, it is to be understood that other forms might be adopted.

What is claimed is as follows:

1. In the art of spacing a plurality of substantially parallel-walled articles in racked or stacked relation for storage or shipment, one or more detachably secured unitary spacers, one wall of a first of said articles having one or more apertures adapted to receive said spacers; each of said spacers having an attaching portion, a shank portion, and a buffer portion adapted to contact the adjacent wall of a second of said articles; said attaching portion including an element adapted to extend through one of said apertures and having retaining means thereon, said element being of substantially less cross-sectional area than said aperture whereby each spacer is allowed limited movement in a plane substantially parallel to said one wall and commensurate with the contours and shifting movement of said second article relative to said first article.

2. In a unitary spacer adapted to be removably attached to one of a series of articles to be shipped or stored in ranked or stacked relation, each of said articles having substantially parallel panels, one of which is provided with openings and another of which has a finished surface: an attaching portion, a shank portion and a buffer portion at the opposite end of said shank portion from said attaching portion, said buffer portion having a surface adapted to contact the finished surface of a second article adjacent said one article; said attaching portion comprising a rib portion extendable through one of said panel openings and having a thickness in the plane of said opening substantially less than the width of said opening, and flanges extending from said rib portion on the opposite side of said rib portion from said shank portion and in cooperation with said shank portion defining grooves of substantially greater width than the thickness of said panel at said opening; said flanges extending in a plane parallel to said shank portion and overlapping the edges of said opening when said spacer is attached to said article.

References Cited in the file of this patent
UNITED STATES PATENTS

| | | |
|---|---|---|
| 1,884,830 | Perry | Oct. 25, 1932 |
| 1,915,249 | Jorgensen | June 20, 1933 |
| 1,991,517 | Perry | Feb. 19, 1935 |
| 2,024,101 | Kahn | Dec. 10, 1935 |
| 2,062,948 | Swank et al. | Dec. 1, 1936 |
| 2,449,591 | Couse | Sept. 21, 1948 |